United States Patent
Samara-Rubio

(10) Patent No.: US 6,628,450 B2
(45) Date of Patent: Sep. 30, 2003

(54) METHOD AND APPARATUS FOR PHASE-SHIFTING AN OPTICAL BEAM IN A SEMICONDUCTOR SUBSTRATE

(75) Inventor: Dean A. Samara-Rubio, San Jose, CA (US)

(73) Assignee: Intel Corporation, Santa Clara, CA (US)

( * ) Notice: Subject to any disclaimer, the term of this patent is extended or adjusted under 35 U.S.C. 154(b) by 167 days.

(21) Appl. No.: 10/011,216

(22) Filed: Nov. 15, 2001

(65) Prior Publication Data

US 2003/0090286 A1 May 15, 2003

(51) Int. Cl.[7] .............................. G02F 1/01; G02B 6/12
(52) U.S. Cl. ........................ 359/279; 385/14; 250/515.1
(58) Field of Search ................................. 257/428, 431, 257/432, 435; 359/227, 237, 240, 245, 246, 247, 248, 250, 254, 259, 279; 385/14, 130, 131; 250/505.1, 515.1; 324/765

(56) References Cited

PUBLICATIONS

Bachmann, M., "General self–imaging properties in N×N multimode interference couplers including phase relations", *Applied Optics*, vol. 33, No. 18, pp. 3905–3911, Jun. 20, 1994.

Smit, M.K., "Phasar–Based WDM–Devices: Principles, Design and Applications", *IEEE Journal of Selected Topics in a Quantum Electronics*, vol. 2, No. 2, pp. 236–250, Jun. 1996.

Soldano L.B., "Optical Multi–Mode Interference Devices Based on Self–Imaging: Principles and Applications", *Journal of Lightwave Technology*, vol. 13, No. 4, pp. 615–627, Apr. 1995.

Rajarajan, M., "Accurate Analysis of MMI Devices with Two–Dimensional Confinement", *Journal of Lightwave Technology*, vol. 14, No. 9, Sep. 1996.

Lorenzo, R.M., "Improved self–imaging characteristics in 1×N multimode couplers", *IEE Proc.–Optoelectron.*, vol. 145, No. 1, Feb. 1998.

H. Zimmermann, "Integrated Silicon Optoelectronics", in Springer Series in Photonics, 2000, pp. 203–228, Springer–Verlag Berlin Heidelberg, Germany.

Kareenahalli, S., "Experimental Confirmation of Phase Relationships of Multimode Interference Splitters Using a Shearing–Type Near–Field Sagnac Interferometer", *IEEE Photonics Technology Letters*, vol. 9. No. 7., pp. 937–939, Jul. 1997.

(List continued on next page.)

*Primary Examiner*—Evan Pert
(74) *Attorney, Agent, or Firm*—Blakely, Sokoloff, Taylor & Zafman LLP

(57) ABSTRACT

A semiconductor-based gain optical phase-shifting device, method and apparatus. In one aspect of the present invention, an apparatus according to an embodiment of the present invention includes a semiconductor substrate through which an optical beam is to be directed along an optical path through the semiconductor substrate. A plurality of floating charge modulated regions are disposed along the optical path. A phase of the optical beam is responsive to a charge concentration in each of the plurality of floating charge modulated regions. A plurality of tunneling insulation layers are disposed between each of the plurality of floating charge modulated regions and the semiconductor substrate. A plurality of control nodes are disposed proximate to the plurality of floating charge modulated regions. Each of the control nodes control the charge concentration in a respective one of the plurality of floating charge modulated regions. A plurality of blocking insulation layers disposed between each of the plurality of control nodes and the plurality of floating charge modulated regions.

29 Claims, 2 Drawing Sheets

OTHER PUBLICATIONS

Rasmussen, T., "Design and Performance Evaluation of 1-by-64 Multimode Interference Power Splitter for Optical Communications", *Journal of Lightwave Technology*, vol. 13. No. 10., pp. 2069–2074, Oct. 1995.

E.D. Novak, L. Ding, Y.T. Loh, and C. Hu, "Speed, Power, and Yield Comparison of Thin Bonded SOI versus Bulk SMOS Technologies", in *Proceedings 1994 IEEE International SOI Conference*, Oct. 1994, VLSI Technology, Inc., San Jose, CA, pp. 41–42.

A.G. Rickman, G.T. Reed, and F. Namavar, "Silicon–on–Insulator Optical Rib Waveguide Loss and Mode Characteristics", in *Journal of Lightwave Technology. vol. 12. No. 10.*, Oct. 1994, pp. 1771–1776.

R.A. Soref, J. Schmidtchen, and K. Petermann, "Large Single–Mode Rib Waveguides in GeSi–Si and Si–on–SiO2", in IEEE Journal of Quantum Electronics. vol. 27. No. 8., Aug. 1991, pp. 1971–1974.

S.P. Pogossian, L. Vescan, and A. Vonsovici, "The Signle–Mode Condition for Semiconductor Rib Waveguides with Large Cross Section", in Journal of Lightwave Technology. vol. 16. No. 10., Oct. 1998, pp. 1851–1853.

METHOD AND APPARATUS FOR PHASE-SHIFTING AN OPTICAL BEAM IN A SEMICONDUCTOR SUBSTRATE

BACKGROUND OF THE INVENTION

1. Field of the Invention

The present invention relates generally to optical devices and, more specifically, the present invention relates to a phase-shifting device.

2. Background Information

The need for fast and efficient optical switches is increasing as Internet data traffic growth rate is overtaking voice traffic pushing the need for optical communications. Two commonly found types of optical devices are mechanical devices and electro-optic devices.

Mechanical devices such as switching devices generally involve physical components that are placed in the optical paths between optical fibers. These components are moved to cause switching action. Micro-electronic mechanical systems (MEMS) have recently been used for miniature mechanical switches. MEMS are popular because they are silicon based and are processed using somewhat conventional silicon processing technologies. However, since MEMS technology generally rely upon the actual mechanical movement of physical parts or components, MEMS are generally limited to slower speed optical applications, such as for example applications having response times on the order of milliseconds.

In known electro-optic devices such as switching devices, interferometers, phase-shifters, etc., voltages are continuously applied to selected parts of a device to create electric fields within the device. The electric fields change the optical properties of selected materials within the device and the electro-optic effect the optical beams. Electro-optic devices typically utilize electro-optical materials that combine optical transparency with voltage-variable optical behavior.

Although the speeds of some known electro-optic devices are very fast, for example on the order of nanoseconds, one disadvantage with known electro-optic devices is that these devices generally require relatively high voltages in order to operate. Consequently, the external circuits utilized to control known electro-optical devices are usually specially fabricated to generate the high voltages and suffer from large amounts of power consumption. In addition, integration of these external high voltage control circuits with present day electro-optical switches is becoming an increasingly challenging task as device dimensions continue to scale down and circuit densities continue to increase.

Another disadvantage with known electro-optic devices is that these devices generally require voltages to be continuously applied in order to operate. Consequently, power is continuously consumed in order to operate these devices. Moreover, these devices no longer function at all if there is a power failure. As a result, the integrity of for example an optical communications system using such a known electro-optic device is compromised in the event of such a power failure.

BRIEF DESCRIPTION OF THE DRAWINGS

The present invention is illustrated by way of example and not limitation in the accompanying figures.

DETAILED DESCRIPTION

Methods and apparatuses for a semiconductor-based optical phase-shifting device are disclosed. In the following description numerous specific details are set forth in order to provide a thorough understanding of the present invention. It will be apparent, however, to one having ordinary skill in the art that the specific detail need not be employed to practice the present invention. In other instances, well-known materials or methods have not been described in detail in order to avoid obscuring the present invention.

Reference throughout this specification to "one embodiment" or "an embodiment" means that a particular feature, structure or characteristic described in connection with the embodiment is included in at least one embodiment of the present invention. Thus, appearances of the phrases "in one embodiment" or "in an embodiment" in various places throughout this specification are not necessarily all referring to the same embodiment. Furthermore, the particular features, structures or characteristics may be combined in any suitable manner in one or more embodiments.

As an overview of the various embodiments of the present invention, semiconductor-based optical phase-shifting devices are provided for optical applications. In various embodiments, the settings of an optical phase-shifting device may be substantially latched with a double polysilicon structure. Accordingly, embodiments of the disclosed optical phase-shifting device continue to shift the phase of an optical beam without the continuous application of power. Embodiments of the disclosed optical phase-shifting device may be useful building blocks for a variety of optical applications such as for example interferometers, optical communications switches or wave division multiplexing (WDM) wavelength-management devices such as phase arrays or the like.

Figure 1:
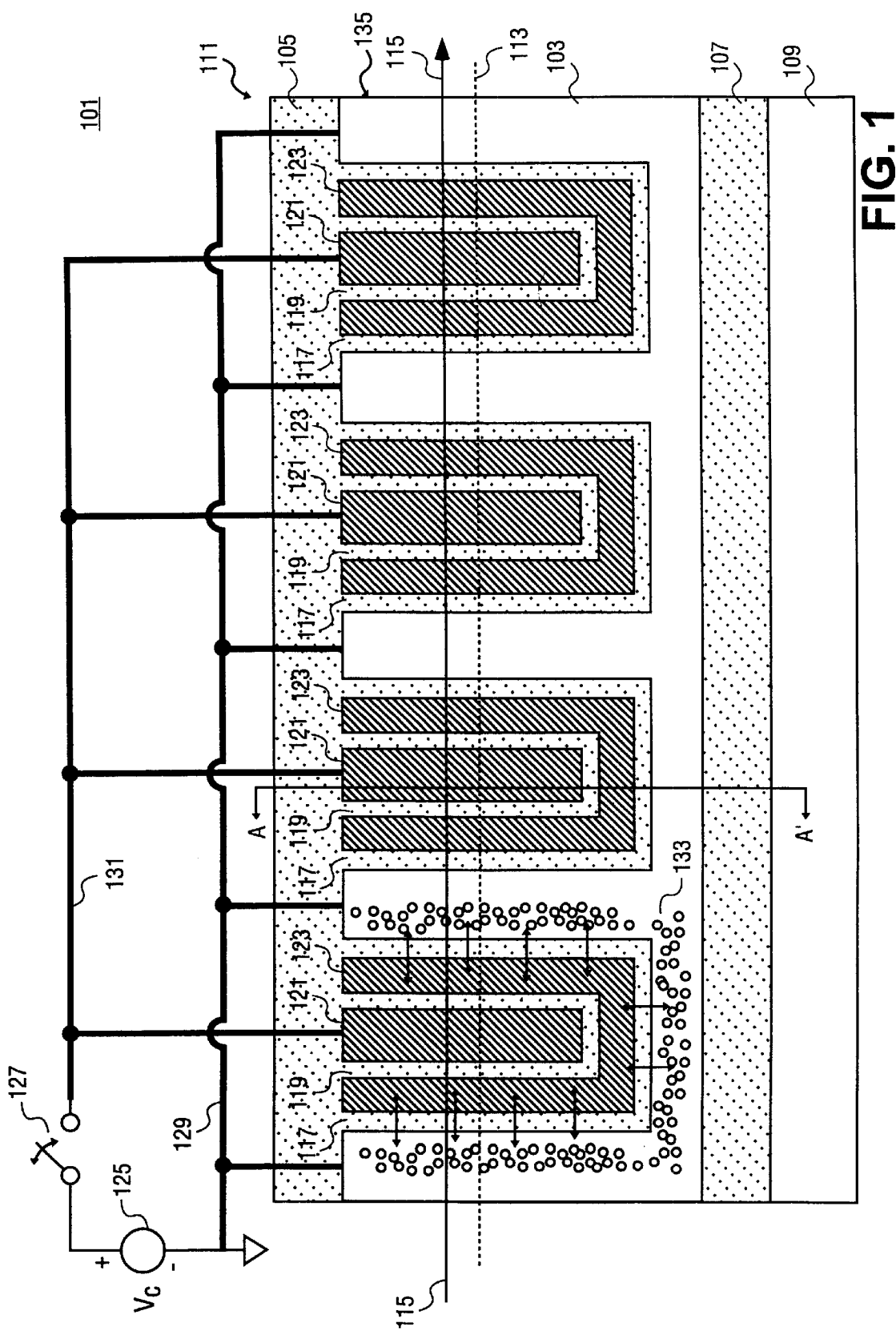
FIG. 1 is a side view illustration of one embodiment of an optical phase-shifting device including a floating charge modulated regions disposed in a semiconductor substrate in accordance with the teachings of the present invention.

To illustrate, FIG. 1 is a side view illustration of one embodiment of an optical phase-shifting device 101 in accordance with the teachings of the present invention. In one embodiment, optical phase-shifting device 101 includes a semiconductor substrate 103 in which a plurality of floating charge modulated regions 123 are disposed. In one embodiment, semiconductor substrate 103 includes silicon and floating charge modulated regions 123 include polysilicon. As shown in the depicted embodiment, floating charge modulated regions 123 are insulated from semiconductor substrate 103 with tunneling insulation layers 117. In one embodiment, optical phase-shifting device 101 also includes a plurality of control nodes 121, which are disposed proximate to each of the floating charge modulated regions 123 across blocking insulation layers 119. In one embodiment, control nodes 121 include polysilicon. In one embodiment, semiconductor substrate 103 includes P-type silicon and floating charge modulated regions 123 and control nodes 121 include N-type polysilicon. In another embodiment, it is appreciated that the polarities may be reversed and that semiconductor substrate 103 may include N-type silicon and floating charge modulated regions 123 and control nodes 121 may include P-type polysilicon.

It is appreciated that the disclosed structure of semiconductor substrate 103, tunneling insulation layers 117, floating charge modulated regions 123, blocking insulation layers 119 and control nodes 121 may be compared to a plurality of double-stacked capacitors disposed along an optical path of a semiconductor-based optical waveguide. Assuming this example, each of the double-stacked capacitors includes three "plates," each of which is separated by insulating layers. The first plate is coupled to ground and may be the semiconductor substrate 103, the second or floating center plates may be floating charge modulated regions 123 and the third plates are switchably coupled to a power source and may be the control nodes 121. As will be discussed, phase shifting or modulation is realized in accordance with the teachings of the present invention by directing an optical beam through at least the center plates, or floating charge modulated regions 123, in which the concentration of free charge carriers are stored and modulated.

As shown in FIG. 1, an embodiment of optical phase-shifting device also includes an adjustable power source 125, which is coupled to ground and semiconductor substrate 103 through conductor 129, and is coupled to control nodes 121 through conductor 131. In one embodiment, power source 125 is a voltage source, current source, or the like, and may be enabled or disabled with a switch 127. In one embodiment, switch 127 may be electrical, mechanical, or the like. As shown in the depicted embodiment, control nodes 121 are therefore switchably coupled to be set to an adjustable control voltage $V_C$ by power source 125. In particular, when switch 127 is enabled or closed, power supply 125 is enabled and control nodes 121 are coupled to be set to $V_C$. When switch 127 is disabled or opened, power source 125 is disabled and control nodes 121 are not coupled to power source 125 and therefore allowed to float. In one embodiment, $V_C$ is contemplated to be in a relatively low voltage range on the order of for example only 5–15 volts.

In one embodiment, semiconductor substrate 103 includes a waveguide 135, which has an optical path 113 that is directed through semiconductor substrate 103 as well as floating charge modulated regions 123. In one embodiment, optical path 113 is also directed through control nodes 121. As will be discussed, waveguide 135 in one embodiment is a rib waveguide. In one embodiment, an optical beam 115 along optical path 113 through semiconductor substrate 103 and floating charge modulated regions 123. In one embodiment, optical beam 115 is also directed through control nodes 121. Optical beam 115 includes infrared or near infrared light in one embodiment. As known to those skilled in the art, the silicon and polysilicon of one embodiment of semiconductor substrate 103, floating charge modulated regions 123 and control nodes 121 are partially transparent to the infrared or near infrared light. In an embodiment in which optical phase-shifting device 101 is utilized in optical communications, optical beam 115 has one or more channels or wavelengths around approximately 1.55 or 1.3 micrometers.

In one embodiment, optical phase-shifting device 101 is included in a silicon-on-insulator (SOI) wafer 111. As shown in the embodiment depicted in FIG. 1, SOI wafer 111 includes a plurality of semiconductor and insulating layers. FIG. 1 shows that semiconductor substrate 103 is disposed between insulating layers 105 and 107 and that insulating layer 107 is disposed between semiconductor substrate 103 and another semiconductor substrate 109. In one embodiment, insulating layer 107 includes a buried oxide layer of SOI wafer 111 and insulating layer 105 includes an interlayer dielectric of SOI wafer 111.

In one embodiment, insulating layers 105 and 109 serve as optical confinement layers of optical phase-shifting device 101. In particular, optical energy or light from optical beam 115 is reflected from the interfaces between semiconductor substrate 103 and insulating layers 105 and 107. For example, light from optical beam 115 will have an angle of incidence θ relative to the interface between semiconductor substrate 103 and insulating layer 105 or 107. For purposes of this disclosure, an incident angle θ is the angle that an optical beam makes with an imaginary line perpendicular to a surface at the point of incidence. In the embodiment depicted in FIG. 1, optical beam 115 is deflected off the interface between semiconductor substrate 103 and insulating layer 105 or 107 because of total internal reflection.

In one embodiment, insulating layers 105 and 107 include silicon oxide or the like and have an index of refraction of approximately $n_{oxide}=1.5$. Semiconductor substrate 103 includes silicon and has an index of refraction of approximately $n_{Si}=3.5$. In order to have total internal reflection of optical beam 115, the incident angle θ of optical beam 115 relative to the interface between semiconductor substrate 103 and insulating layer 105 or 107 satisfies the following relationship:

$$\sin\theta > n_{oxide}/n_{Si} \qquad \text{(Equation 1)}$$

As a result of the total internal reflection, optical beam 115 is in one embodiment is confined to remain with semiconductor substrate 103 and pass through floating charge modulated regions 123 along optical path 113 as shown in FIG. 1.

As summarized above, floating charge modulated regions 123 are insulated from semiconductor 103 and control nodes 121 with tunneling insulation layers 117 and blocking insulation layers 119, respectively. Accordingly, floating charge modulation regions 123 are non-volatile since floating charge modulation regions 123 store charge or free charge carriers. As will be discussed, this feature enables optical phase-shifting device 101 to operate without power being supplied continuously by power source 125 or during a power failure in accordance with the teachings of the present invention.

In general, an embodiment of optical phase-shifting device 101 includes three basic modes of operation: programming mode, latching mode and tuning mode. In programming mode, power source 125 is enabled and/or switch 127 is closed or enabled. When programming optical phase-shifting device 101, power source 125 may be adjusted to provide a control voltage $V_C$ that is greater than a first threshold voltage $V_{TH}^+$, or $$V_C > V_{TH}^+. \qquad \text{(Equation 2)}$$

When $V_C$ is greater than $V_{TH}^+$, free charge carriers 133 are drawn from semiconductor substrate 103 into floating charge modulated regions 123 through tunneling insulation layers 117, as shown in the embodiment depicted in FIG. 1. Accordingly, the tunneling insulation layers 117 allow a net current flow and charge buildup on the floating charge modulated regions 123 when the electric field resulting from $V_C$ applied across semiconductor substrate 103 and control nodes 121 exceeds the threshold value for programming.

When programming optical phase-shifting device 101, power source 125 may also be adjusted to provide a control voltage $V_C$ that is less than a second threshold voltage $V_{TH}^-$, or $$V_C < V_{TH}^-. \qquad \text{(Equation 3)}$$

When $V_C$ is less than $V_{TH}^-$, free charge carriers 133 are driven from floating charge modulated regions 123 through tunneling insulation layers 117 into semiconductor substrate 103, as also shown in the embodiment depicted in FIG. 1. Accordingly, the tunneling insulation layers 117 allow a net current flow and discharge from the floating charge modulated regions 123 into semiconductor substrate 103 when the control voltage $V_C$ is less than the second threshold voltage $V_{TH}^-$.

In the examples shown in FIG. 1, it is appreciated that free charge carriers 133 are illustrated as entering and/or exiting only the floating charge modulated regions 123 on the left hand side of FIG. 1 for brevity. It is appreciated that free charge carriers 133 enter and exit all of the floating charge modulated regions 123 across respective tunneling oxide layers 117 to and from semiconductor substrate 103 in accordance with the teachings of the present invention.

In latching mode, power source 125 is disabled and/or switch 127 is opened or disabled. It is appreciated that latching mode is also automatically entered in the event of a power failure and power source 125 is consequently disabled. In this mode of operation, the concentration of free charge carriers 133 in floating charge modulated regions 123 is substantially fixed because tunnel insulation layers 117 and blocking insulation layers 119 substantially block the flow of free charge carriers 133 to and from semiconductor substrate 103 and control nodes 121, respectively. Indeed, while in latching mode, the charge on floating charge modulated regions 123 is fixed and can dissipate only very slowly from mechanisms such as alpha-particle impacts, thermal emission, or the like.

When in tuning mode, power source 125 is enabled and/or switch 127 is closed or enabled. When tuning optical phase-shifting device 101, power source 125 is adjusted to provide a control voltage $V_C$ that is between the first and second threshold voltages $V_{TH}^+$ and $V_{TH}^-$, or $$V_{TH}^- < V_C < V_{TH}^+. \quad \text{(Equation 4)}$$

When $V_C$ is between $V_{TH}^{-\ l\ and\ V}{}_{TH}^+$, the concentration of free charge carriers 133 in floating charge modulated regions 123 is substantially fixed. However, the distribution and/or concentration of free charge carriers 133 along optical path 113 in semiconductor substrate 103 and/or control nodes 121 may be fine-tuned in response to $V_C$. To illustrate, assuming that free charge carriers 133 are electrons, as $V_C$ becomes more positive, control nodes 121 become more positive. Accordingly, the electrons of free charge carriers 133 are redistributed in floating charge modulated regions 123 to be more concentrated closer to control nodes 121. Conversely, as $V_C$ becomes less positive, control nodes 121 become less positive. Accordingly, the electrons of free charge carriers 133 are redistributed in floating charge modulated regions 123 to be less concentrated closer to control nodes 121. The concentration of charge carriers in semiconductor substrate 103 is affected similarly along optical path 113. Thus, by adjusting or tuning the control voltage $V_C$ applied to control nodes 121, free charge carriers 133 are redistributed in floating charge modulated regions 123 to screen the electric field and charge carriers are supplied by the ground and $V_C$ terminals of power supply 125 to balance the charges on tunneling insulation layers and blocking insulation layers 117 and 119. Therefore, with the redistribution of free charge carriers 133 in floating charge modulated regions 123 in tuning mode as described above, the distribution of free charge carriers 133 along optical path 113 in semiconductor substrate 103 and/or control nodes 121 is affected accordingly across tunneling insulation layers and blocking insulation layers 117 and 119, respectively.

It is appreciated that in the embodiments of the programming, latching and tuning modes described above, tunneling current, if any, through blocking insulation layers 119 between floating charge modulated regions 123 and control nodes 121 is insignificant. In addition, it is noted that for explanation purposes, free charge carriers 133 have been described above using electrons or negative charge as free charge carriers 133. It is appreciated that in another embodiment, the polarities of these charges, the doping of the silicon and polysilicon and the voltages applied power source 125 may be reversed. Thus, in such an embodiment, holes or positive charge carriers are swept into or driven from floating charge modulated regions 123 in accordance with the teachings of the present invention.

In one embodiment, the phase of optical beam 115 is responsive, shifted or modulated as it propagates along optical path 113 through free charge carriers 133 due to the plasma optical effect. In particular, the plasma optical effect arises due to an interaction between the optical electric field vector and free charge carriers 133 that may be present along the optical path 113 of the optical beam 115 through semiconductor substrate 103, floating charge modulated regions 123 and control nodes 121. The electric field of the optical beam 115 polarizes the free charge carriers 133 and this effectively perturbs the local dielectric constant of the medium. This in turn leads to a perturbation of the propagation velocity of the optical wave of optical beam 115 and hence the refractive index for the light, since the refractive index is simply the ratio of the speed of the light in vacuum to that in the medium. The free charge carriers 133 are accelerated by the field and also lead to absorption of the optical field as optical energy is used up. Generally the refractive index perturbation is a complex number with the real part being that part which causes the velocity change and the imaginary part being related to the free charge carrier absorption. The amount of phase-shift $\phi$ is given by $$\phi = (2\pi/\lambda)\Delta nL \quad \text{(Equation 5)}$$

with the optical wavelength $\lambda$ and the interaction length L. In the case of the plasma optical effect in silicon, the refractive index change $\Delta n$ due to the electron ($\Delta N_e$) and hole ($\Delta N_h$) concentration change is given by:

$$\Delta n = -\frac{e^2\lambda^2}{8\pi^2 c^2 \varepsilon_0 n_0}\left(\frac{b_e(\Delta N_e)^{1.05}}{m_e^*} + \frac{b_h(\Delta N_h)^{0.8}}{m_h^*}\right) \quad \text{(Equation 6)}$$

where $n_o$ is the nominal index of refraction for silicon, e is the electronic charge, c is the speed of light, $\varepsilon_0$ is the permittivity of free space, $m_e^*$ and $m_h^*$ are the electron and hole effective masses, respectively, $b_e$ and $b_h$ are fitting parameters.

Figure 2:
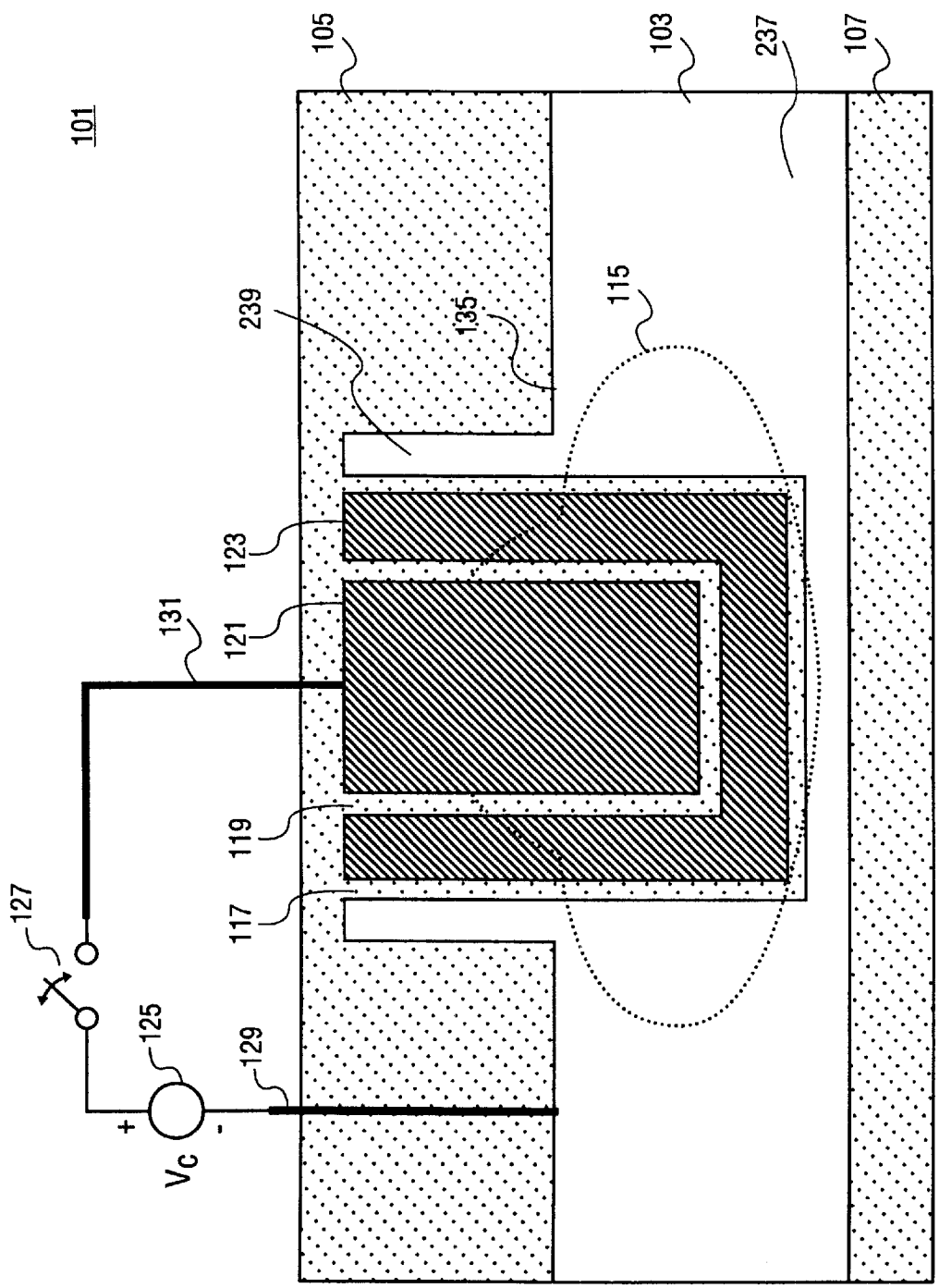
FIG. 2 is a cross-section illustration through one embodiment of a control node and a floating charge modulated region disposed in a semiconductor substrate in accordance with the teachings of the present invention

FIG. 2 is a cross-section illustration through one embodiment of an optical phase-shifting device 101 in accordance with the teachings of the present invention. The cross-section of optical phase-shifting device 101 shown in FIG. 2 corresponds to section A–A' shown in FIG. 1. As shown, a cross section of waveguide 135 of optical phase-shifting device 101 includes semiconductor substrate 103 disposed between insulating layers 105 and 107. Control node 121 and floating charge modulated region 123 are disposed in waveguide 135. Tunneling insulation layer 117 insulates floating charge modulated region 123 from semiconductor substrate 103 and blocking insulating layer 119 insulates floating charge modulated region 123 and control node 121 from each other. In the depicted embodiment, power source 125 is coupled to semiconductor substrate 103 through conductor 129. Power source 125 is also coupled to control node 121 through conductor 131 and switch 127.

As shown, the rib waveguide 135 includes a rib region 239 and a slab region 237. In the embodiment illustrated in FIG. 2, the intensity distribution of a single mode optical beam 115 is shown propagating through the rib waveguide 135. As shown, the intensity distribution of optical beam 115 is such that of the majority of the optical beam 115 propagates through a portion of rib region 239 towards the interior of the rib waveguide 135. In addition, a portion of optical beam 115 propagates through a portion of slab region 237 towards the interior of the rib waveguide 135. As also shown with the intensity distribution of optical beam 115, the intensity of the propagating optical mode of beam 115 is vanishingly small at the "upper corners" of rib region 239 as well as the "sides" of slab region 237. Accordingly, since the floating charge modulated region 123 is disposed towards the interior of rib waveguide 135 as shown, the majority of optical beam 115 is directed through floating charge modulated region 123. Thus, phase-shifting of optical beam 115 is realized with the modulation of charge concentration of free charge carriers in floating charge modulated region 123 in accordance with the teachings of the present invention.

In the foregoing detailed description, the method and apparatus of the present invention have been described with reference to specific exemplary embodiments thereof. It will, however, be evident that various modifications and changes may be made thereto without departing from the broader spirit and scope of the present invention. The present specification and figures are accordingly to be regarded as illustrative rather than restrictive.

What is claimed is:

1. An apparatus, comprising:
   a semiconductor substrate through which an optical beam is to be directed along an optical path through the semiconductor substrate;
   a plurality of floating charge modulated regions disposed along the optical path, a phase of the optical beam responsive to a charge concentration in each of the plurality of floating charge modulated regions;
   a plurality of tunneling insulation layers disposed between each of the plurality of floating charge modulated regions and the semiconductor substrate;
   a plurality of control nodes disposed proximate to the plurality of floating charge modulated regions; each of the control nodes to control the charge concentration in a respective one of the plurality of floating charge modulated regions; and
   a plurality of blocking insulation layers disposed between each of the plurality of control nodes and the plurality of floating charge modulated regions.

2. The apparatus of claim 1 further comprising an optical waveguide disposed in the semiconductor substrate, the optical path routed through the optical waveguide.

3. The apparatus of claim 2 wherein the optical waveguide is an optical rib waveguide.

4. The apparatus of claim 1 further comprising an adjustable power source selectively coupled to at least one of the plurality of control nodes to control the charge concentration in the respective floating charge modulated regions.

5. The apparatus of claim 4 further comprising a switch coupled between the adjustable power source and said at least one of the plurality of control nodes, the charge concentration in the respective floating charge modulated regions responsive to the adjustable power source when the switch is enabled, the charge concentration in the respective floating charge modulated regions independent of the adjustable power source when the switch is disabled.

6. The apparatus of claim 5 wherein a charge concentration in the semiconductor substrate along the optical path is responsive to the adjustable power source when the switch is enabled, the charge concentration in the semiconductor substrate along the optical path independent of the adjustable power source when the switch is disabled.

7. The apparatus of claim 5 wherein the plurality of control nodes are disposed along the optical path, wherein a charge concentration in the plurality of control nodes along the optical path is responsive to the adjustable power source when the switch is enabled, the charge concentration in the plurality of control nodes along the optical path independent of the adjustable power source when the switch is disabled.

8. The apparatus of claim 5 wherein the adjustable power source comprises an adjustable voltage source.

9. The apparatus of claim 1 wherein the semiconductor substrate comprises silicon.

10. The apparatus of claim 1 wherein the plurality of floating charge modulated regions comprise polysilicon.

11. The apparatus of claim 1 wherein the plurality of control nodes comprise polysilicon.

12. The apparatus of claim 1 wherein the semiconductor substrate is included in a silicon-on-insulator (SOI) wafer.

13. The apparatus of claim 1 wherein the semiconductor substrate comprises III–V semiconductor material.

14. The apparatus of claim 1 wherein the charge concentration in each of the plurality of floating charge modulated regions is a concentration of electrons in each of the plurality of floating charge modulated regions.

15. The apparatus of claim 1 wherein the charge concentration in each of the plurality of floating charge modulated regions is a concentration of holes in each of the plurality of floating charge modulated regions.

16. An apparatus, comprising:
   a silicon-on-insulator (SOI) wafer, the SOI wafer including a plurality of insulating layers and a plurality of semiconductor layers including a first semiconductor layers is disposed between two of the plurality of insulating layers;
   an optical waveguide disposed in the first semiconductor layer between said two of the plurality of insulating layers;
   a plurality of floating polysilicon regions disposed along the optical waveguide in the first semiconductor layer such that on optical beam directed through the optical waveguide is directed through the plurality of floating polysilicon regions, each of the plurality of floating polysilicon regions separated from the first semiconductor layer across a tunneling insulation layer;
   a plurality of control nodes disposed proximate to the plurality of floating polysilicon regions to control a charge concentration in the plurality of floating polysilicon regions, each of the plurality of control nodes separated from a respective floating polysilicon region across a blocking insulation layer, wherein a phase of the optical beam is responsive to the charge concentration in the plurality of floating polysilicon regions; and
   an adjustable power source switchably coupled to at least one of the plurality of control nodes to control the charge concentration in the plurality of floating polysilicon regions.

17. The apparatus of claim 16 wherein the power source comprises a voltage source.

18. The apparatus of claim 16 further comprising a switch coupled between the power source and said at least one of the plurality of control nodes.

19. The apparatus of claim 18 wherein the charge concentration in the plurality of floating polysilicon regions is responsive to the power source when the switch is enabled.

20. The apparatus of claim 16 wherein the charge concentration in the plurality of floating polysilicon regions is independent of the power source when the switch is disabled.

21. The apparatus of claim 16 wherein the charge concentration in the plurality of floating polysilicon regions comprises a concentration of electrons in the plurality of floating polysilicon regions.

22. The apparatus of claim 16 wherein the charge concentration in the plurality of floating polysilicon regions comprises a concentration of holes in the plurality of floating polysilicon regions.

23. A method, comprising:
    directing an optical beam through an optical path disposed in a semiconductor substrate;
    directing the optical beam through a plurality of floating charge modulated regions disposed along the optical path;
    shifting a phase of the optical beam in response to a charge concentration in the plurality of floating charge modulated regions;
    adjusting the charge concentration in the plurality of floating charge modulated regions with a power source; and
    fixing substantially the charge concentration in the plurality of floating charge modulated regions by disabling the power source.

24. The method of claim 23 wherein fixing substantially the charge concentration in the plurality of floating charge modulated regions by disabling the power source comprises disabling a switch coupled to the power source.

25. The method of claim 23 wherein adjusting the charge concentration in the plurality of floating charge modulated regions comprises enabling a switch coupled to the power source and adjusting an output voltage of the power supply.

26. The method of claim 25 wherein adjusting the output voltage of the power supply comprises adjusting the output voltage to be greater than a first threshold so as to draw charge carriers into the plurality of floating charge modulated regions from the semiconductor substrate across a tunneling insulation layer disposed between the plurality of floating charge modulated regions and the semiconductor substrate.

27. The method of claim 25 wherein adjusting the output voltage of the power supply comprises adjusting the output voltage to be less than a second threshold so as to drive charge carriers from the plurality of floating charge modulated regions into the semiconductor substrate across a tunneling insulation layer disposed between the plurality of floating charge modulated regions and the semiconductor substrate.

28. The method of claim 25 wherein adjusting the output voltage of the power supply comprises adjusting the output voltage to be between first and second thresholds so as to tune a charge concentration in the semiconductor substrate along the optical path proximate to the plurality of floating charge modulated regions, the phase of the optical beam responsive to the charge concentration in the semiconductor substrate along the optical path.

29. The method of claim 25 wherein adjusting the output voltage of the power supply comprises adjusting the output voltage to be between first and second thresholds so as to tune a charge concentration in at least one control node coupled to the power source along the optical path, the control node capacitively coupled to at least one of the plurality of floating charge modulated regions across the tunneling insulation layer, the phase of the optical beam responsive to the charge concentration in the control node along the optical path.

* * * * *